United States Patent
Barsness et al.

(10) Patent No.: US 7,447,732 B2
(45) Date of Patent: Nov. 4, 2008

(54) RECOVERABLE RETURN CODE TRACKING AND NOTIFICATION FOR AUTONOMIC SYSTEMS

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/444,205

(22) Filed: May 23, 2003

(65) Prior Publication Data

US 2004/0236822 A1    Nov. 25, 2004

(51) Int. Cl.
*G06F 15/16* (2006.01)

(52) U.S. Cl. ............... 709/201; 712/227; 712/231; 712/244; 707/1; 707/3; 707/6; 707/200; 707/202; 717/124; 717/154; 717/161; 714/45; 714/46; 714/15; 718/101; 718/102; 718/106

(58) Field of Classification Search ............... 709/201, 709/217, 219; 707/1, 3, 6, 200, 202

See application file for complete search history.

(56) References Cited

U.S. PATENT DOCUMENTS

| 6,085,191 A * | 7/2000 | Fisher et al. ............... 707/9 |
| 6,236,996 B1 * | 5/2001 | Bapat et al. ............... 707/9 |
| 6,304,873 B1 * | 10/2001 | Klein et al. ............... 707/8 |
| 6,324,683 B1 * | 11/2001 | Fuh et al. ............... 717/124 |
| 6,874,010 B1 * | 3/2005 | Sargent ............... 709/203 |
| 2001/0039545 A1 * | 11/2001 | Nishizawa ............... 707/9 |

* cited by examiner

*Primary Examiner*—William C. Vaughn, Jr.
*Assistant Examiner*—Mohamed Ibrahim
(74) *Attorney, Agent, or Firm*—Patterson & Sheridan, LLP (57) ABSTRACT

A system, method and article of manufacture return code management in autonomic systems and more particularly to managing execution of operations in data processing systems on the basis of return code tracking. One embodiment provides a method for managing execution of an operation in a data processing system. The method comprises tracking return codes received from previous executions of the operation in the data processing system, determining an execution behavior of the operation from the tracked return codes, and managing a subsequent execution of the operation on the basis of the determined execution behavior.

23 Claims, 6 Drawing Sheets

RECOVERABLE RETURN CODE TRACKING AND NOTIFICATION FOR AUTONOMIC SYSTEMS

BACKGROUND OF THE INVENTION

1. Field of the Invention

The present invention generally relates to return code management in autonomic systems and more particularly to managing execution of operations in data processing systems on the basis of return code tracking.

2. Description of the Related Art

The creation of increasingly powerful computer (or computing) systems and a continuously improved information technology (IT) infrastructure contribute to a progressive automation of key tasks and processes in today's businesses. Such complex computing systems require a quick and reliable adaptation to frequent changes in the digital environment set up by the IT infrastructure in order to guarantee their failure-free operation. Consequently, today's businesses have a particular need for reliable management and maintenance methods for complex computing systems.

One form of information that reflects the operation of data processing systems is return codes. A return code gives information on the execution of an operation and indicates whether the execution was successful or whether a problem occurred. Different types of return codes may be provided, e.g., notification return codes, warning return codes, and critical return codes. While the notification and warning return codes may be more informational and instructional, the critical return codes generally indicate errors which occur during execution and affect performance or cause failure of the data processing system.

Conventionally, post-processing tools merely format the return code, e.g., in the form of a summary; no automatic action is taken on the return code. Any action taken is explicitly initiated by a human operator. Whether the operator takes action will depend upon an analysis, by the operator, of the relative importance of the return code since simply using the knowledge of the meaning of the received return code is frequently not sufficient. More specifically, while in several cases warning return codes may continuously be ignored, in other cases an appropriate action needs to be taken immediately. For instance, in a programming environment warnings may be reported with respect to a program on problems that can be ignored by a corresponding compiler without changing the semantics of the program. The existence of a warning does not affect the execution of the program. In other words, the program code executes as if it were written correctly (for example, detecting unreachable code does not prevent running it). In contrast, warnings indicating a possible lack of system resources which may affect a subsequent execution of the specific operation can generally not be ignored and require performance of an appropriate action to avoid the lack of system resources.

However, because of the increasing complexity of internetworked computing systems, the IT infrastructure is becoming too large and complex for the world's technicians to manage. Even the sheer number of computer devices internetworked in large complex computing systems rises continuously. Thus, the ever-increasing demands placed on IT infrastructure threaten to undermine the very benefits information technology aims to provide.

Therefore, there is a need for an effective return code management in an autonomic data processing system.

SUMMARY OF THE INVENTION

The present invention is generally directed to a method, system and article of manufacture for return code management in autonomic systems and more particularly for managing execution of operations in data processing systems on the basis of return code tracking.

One embodiment provides a method for managing execution of an operation in a data processing system. The method comprises tracking return codes received from previous executions of the operation in the data processing system, determining an execution behavior of the operation from the tracked return codes, and managing a subsequent execution of the operation on the basis of the determined execution behavior.

Another embodiment provides a method for managing execution of an SQL statement on a relational database of a data processing system. The method comprises tracking return codes received from previous executions of the SQL statement on the relational database, determining an execution behavior of the SQL statement, identifying, on the basis of the determined execution behavior, a predetermined action to be performed with respect to a subsequent execution of the SQL statement, and performing the identified predetermined action in the data processing system.

Still another embodiment provides a computer readable medium containing a program which, when executed, performs a process for managing execution of an operation in a data processing system. The process comprises tracking return codes received from previous executions of the operation in the data processing system, determining an execution behavior of the operation from the tracked return codes, and managing a subsequent execution of the operation on the basis of the determined execution behavior.

Still another embodiment provides a computer readable medium containing a program which, when executed, performs a process for managing execution of an SQL statement on a relational database of a data processing system. The process comprises tracking return codes received from previous executions of the SQL statement on the relational database, determining an execution behavior of the SQL statement, identifying, on the basis of the determined execution behavior, a predetermined action to be performed with respect to a subsequent execution of the SQL statement, and performing the identified predetermined action in the data processing system.

Still another embodiment provides a data processing system comprising a relational database, a return code manager residing in memory for managing execution of an SQL statement on the relational database, and a processor for executing SQL statements on the relational database and for running the return code manager. The return code manager is configured for tracking return codes received from previous executions of the SQL statement on the relational database, determining an execution behavior of the SQL statement, identifying, on the basis of the determined execution behavior, a predetermined action to be performed with respect to a subsequent execution of the SQL statement, and performing the identified predetermined action in the data processing system.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Technical Field

The present invention is generally directed to a system, method and article of manufacture for return code management in autonomic systems and more particularly to managing execution of operations in data processing systems on the basis of return code tracking. Autonomic computing is directed to how computing systems are able to configure, tune and repair themselves, as well as anticipate and solve performance problems automatically. Accordingly, autonomic computing systems should follow four principles: self-configuring (able to adapt to changes in the system), self-optimizing (able to improve performance), self-healing (able to recover from mistakes) and self-protecting (able to anticipate and cure intrusions). By enabling computing systems to be self-maintaining, autonomic computing is expected to have many benefits for business systems, such as reduced operating costs, lower failure rates and more security. However, the invention is not limited to those embodiments possessing all, or combinations of all, of the foregoing characteristics. Rather, the invention is limited only by the claims appended hereto.

Embodiments of the present invention provide autonomic return code management. Further, at least one embodiment implements a self-optimizing feature in an autonomic data processing system by analyzing return codes from executions of operations in the data processing system. For example, if an error occurs and a data processing system receives a critical return code, the data processing system can autonomously decide to perform an appropriate action in order to optimize the performance of the data processing system or to avoid the failure in the future.

The detailed description of the preferred embodiments is related to a particular implementation directed towards execution management for an SQL statement on a relational database of a data processing system on the basis of return code tracking. However, it should be understood by those skilled in the art that the following detailed description of the preferred embodiments is not intended to limit the present invention to this particular implementation. Instead, it should be noted that any implementation of the invention for return code management in any autonomic system, known or unknown, is contemplated. The following detailed description is merely illustrative and intended to facilitate the understanding of the invention.

With respect to the above particular implementation, the following OVERVIEW contains a short overview of database management systems, relational databases, SQL statements and SQL return codes to briefly explain the underlying technical field.

Overview

Databases are computerized information storage and retrieval systems. A relational database management system is a computer database management system (DBMS) that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Reference is made to C. J. Date, An Introduction to Database Systems, 6th edition, Addison-Wesley Publishing Co. Reading, Mass. (1994) for a comprehensive general treatment of the relational database art and is herein incorporated by reference.

In a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. A catalog lookup and add request occurs, for example, when a requesting entity requests to add triggers or constraints to a file.

In a relational database environment a DBMS is structured to accept commands to store, retrieve and delete data from tables stored in a relational database using high-level query languages such as the Structured Query Language (SQL). The term "query" denominates a set of commands for retrieving data from a stored database. The SQL standard has been promulgated by and available from the International Standards Association since 1986.

One of the most common executed SQL queries is the SELECT statement. In the SQL standard, the SELECT statement generally has the format: "SELECT<clause> FROM<clause> WHERE<clause> GROUP BY<clause> HAVING<clause> ORDER BY<clause>". The clauses must generally follow this sequence. Only the SELECT and FROM clauses are required and all other clauses are optional.

The result of a SELECT statement is, in general, a subset of data retrieved from one or more existing tables stored in the relational database, wherein the FROM clause identifies the name of the table or tables from which the data is being selected. The subset of data is treated as a new table, termed the result table. The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specifies a comparison between two values from certain columns, constants or correlated values. Multiple predicates in the WHERE clause are typically connected by Boolean operators.

For each executed statement in a data processing system, the DBMS returns a return code message (referred to as the return code) having a message identifier that consists of a prefix (SQL) and a message number. There are three return code types: notification, warning, and critical. Accordingly, message identifiers ending with an N are notification or informational return codes. Those ending with a W indicate warning or instructional return codes. Message identifiers ending with a C indicate critical system error return codes. For instance, for an executed SELECT statement the return code may be an "SQL0000W" return code which indicates that the SELECT statement executed successfully. Another possible return code for the SELECT statement is an "SQL0100W" return code which indicates that the result of the statement is an empty table. Thus, the return codes are indicators of the performance of the data processing system.

In the following, the basic principles of the invention are explained in more detail with respect to the above described particular implementation.

Introduction

Behind most applications lies a database and more often than not it will be the way in which data from the database is accessed, retrieved and updated through database access requests that will cause the performance of an application to change. Over time many factors will come into play and change the performance of the application because of given database access requests. Embodiments of the invention are directed towards having a computing system self detect subtle problems that compound over time while an application is running database access requests on databases.

More specifically, embodiments of the present invention are related to an effective analysis in a data processing system of the return codes of SQL statements. Return codes that reflect problems occurring during execution of an application are identified. This effort is complicated, however, due to the fact that certain return codes are standard and do not necessarily reflect a problem, especially if they are not classified as critical error return codes. For instance, a SELECT statement may normally produce an SQL0000W return code, but for some unknown reason this statement fails, from time to time, to return a result (i.e., the result is an empty table) and produces an SQL0100W return code. Another example is an application that inserts records into a given data file using an INSERT statement. Assume that after a period of normal operation, the data processing system detects that the INSERT statement started to produce an SQL0803N return code. The SQL0803N return code means that a corresponding record cannot be added to the given data file because of duplicate keys already existing in the file. These return codes are, however, standard. Therefore, simply monitoring the return codes for a specific SQL statement is not sufficient in order to prevent sub-optimal performance of the data processing system. Instead, performance evolution of a repetitive execution of the SQL statement in connection with a corresponding multiplicity of received return codes should be analyzed. Thus, an access pattern can be defined for the SQL statement which indicates whether a return code for the SQL statement is outside a predefined norm for the statement or not. If it is determined that the return code is outside the predefined norm, a predetermined action can be identified and performed in order to prevent the sub-optimal performance of the data processing system.

Accordingly, one embodiment provides a method for managing execution of an SQL statement on a relational database of a data processing system. To this end, return codes received from previous executions of the SQL statement on the relational database are tracked. The tracked return codes are used in order to determine an execution behavior of the SQL statement. Furthermore, on the basis of the determined execution behavior, a predetermined action to be performed with respect to a subsequent execution of the SQL statement is identified. The identified predetermined action is then performed in the data processing system. Thus, a self-optimizing feature is provided for autonomic data processing systems using an improved return code analysis.

PREFERRED EMBODIMENTS

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
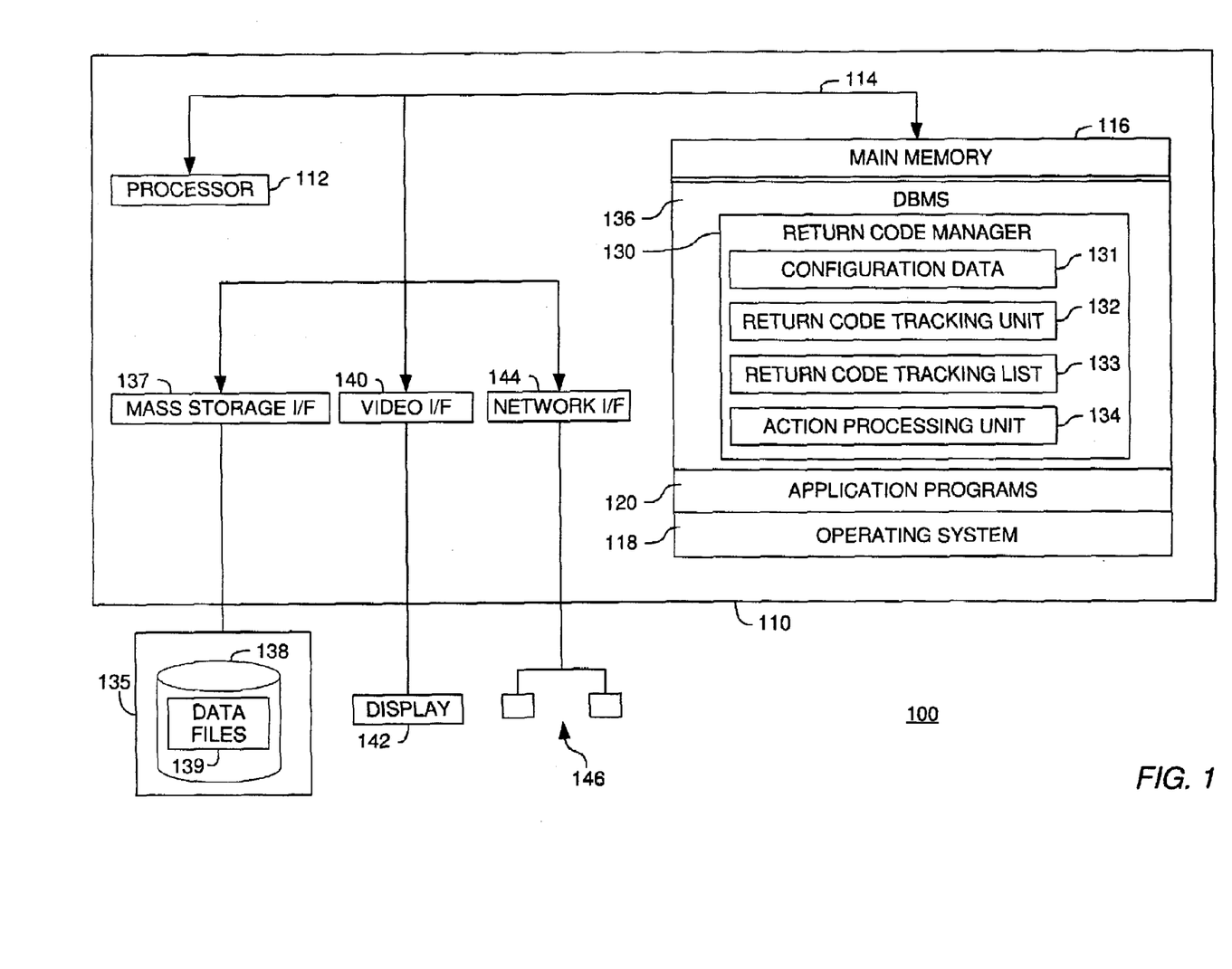
FIG. 1 is a computer system illustratively utilized in accordance with the invention.

Referring now to FIG. 1, a computing environment 100 is shown. In general, the distributed environment 100 includes a data processing system 110, interchangeably referred to as the computer system 110, and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one possible configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 135, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110 or in the computing environment 100, for example, any storage capacity used as virtual memory or stored on a mass storage device (e.g., direct access storage device 135) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more application programs 120 and a database management system (DBMS) 136. In one embodiment, the applications 120 (and more generally, any requesting entity, including the operating system 118 and, at the highest level, users) issue queries against one or more relational databases 138 (for simplicity, only one database is shown). More specifically, the applications 120 issue queries against one or more data files 139 stored in the relational database 138. It should be noted that the relational database 138 merely represents a specific implementation of the invention in one embodiment. However, any collection of data regardless of the particular physical representation is contemplated. By way of illustration, instead of being organized according to a relational schema accessible by SQL queries, the database may be organized according to an XML schema (accessible by XML queries). Thus, the invention is not limited to a particular schema and contemplates extension to schemas presently unknown. As used herein, the term "schema" generically refers to a particular arrangement of data.

Illustratively, the relational database 138 is stored in the direct access storage device 135. However, it should be appreciated that the relational database 138 can be stored in any other suitable storage means, including a remote storage device or the main memory 116. In the latter case, the relational database 138 could be part of the DBMS 136.

The DBMS includes a return code manager 130. The return code manager 130 and the application programs 120 are software products comprising a plurality of instructions that are resident at various times in various memory and storage devices in the computing environment 100. When read and executed by one or more processors 112 in the computer system 110, the application programs 120 and the return code manager 130 cause the computer system 110 to perform the steps necessary to execute steps or elements embodying the various aspects of the invention.

The return code manager 130 is shown having a plurality of components implementing constituent functions. These components include configuration data 131, a return code tracking unit 132, a return code tracking list 133 and an action processing unit 134. However, the return code manager 130 may alternatively be implemented without providing separate components, i.e., as a single software product implemented in a procedural approach. The return code manager 130 is further described below with reference to FIG. 2.

Figure 2:
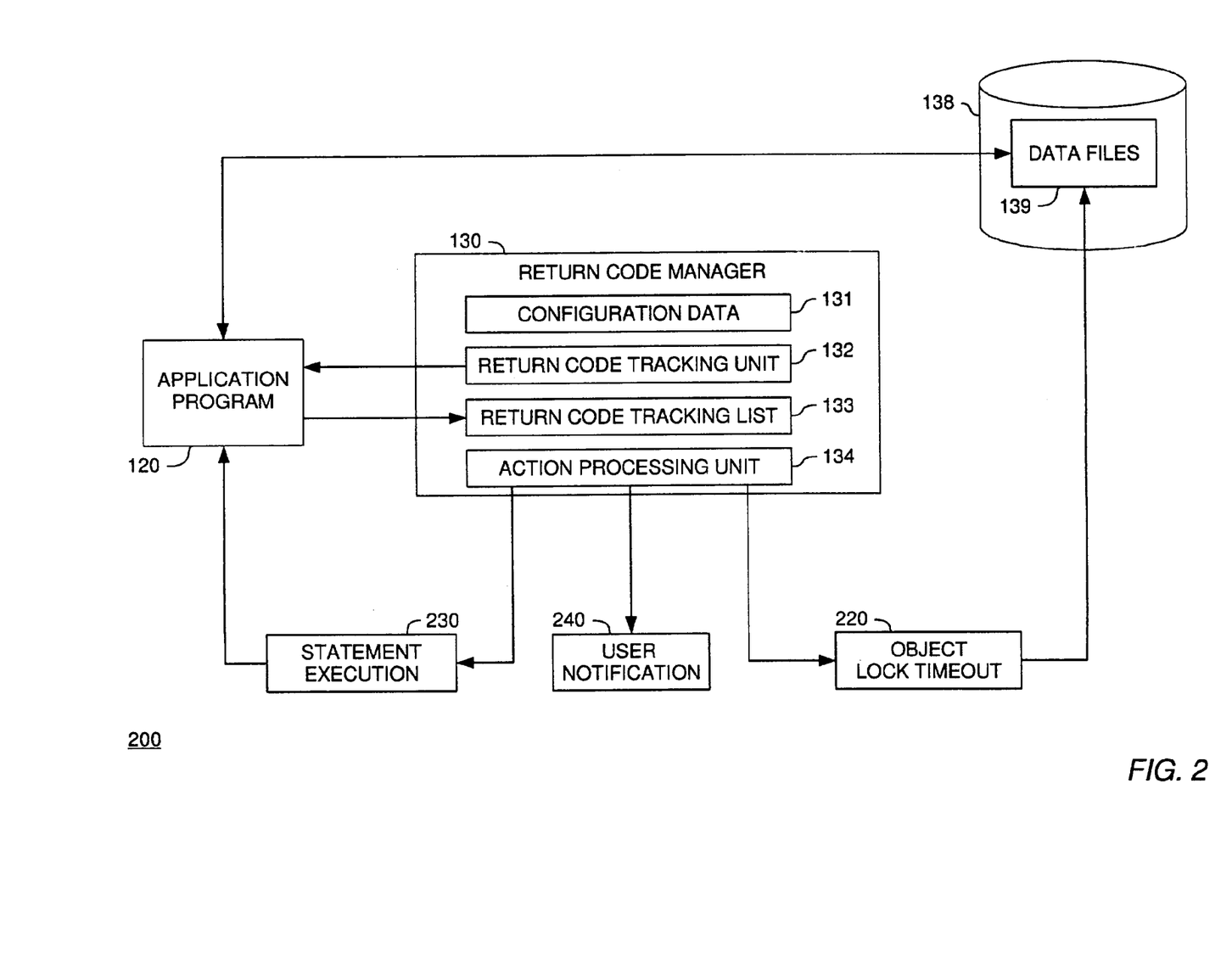
FIG. 2 is a relational view of components implementing the invention.

FIG. 2 shows an illustrative relational view 200 of the return code manager 130 and other components of the invention. The return code manager 130 is configured to perform an effective return code analysis in the data processing system 110. This return code analysis focuses on return codes of SQL statements produced in running of an application 120. On the basis of the return code analysis, the application 120 may be modified in order to optimize performance of the application 120. In other words, the application 120 can autonomously identify and perform a predetermined action designed to optimize its performance.

More specifically, the return code manager 130 is configured for managing execution of SQL statements issued by the application 120 against the relational database 138 of the data processing system 110. To this end, the return code manager 130 tracks return codes produced by executions of SQL statements against the relational database 138. An example of tracked return codes is described below with reference to FIG. 4.

The tracked return codes are analyzed to determine an access pattern (also referred to as execution behavior) for each executed SQL statement. Thus, the access patterns provide some historical knowledge about execution of corresponding SQL statements against the relational database 138. In order to determine whether the corresponding SQL statements perform correctly over time, the access patterns are continuously compared with predefined access patterns (i.e., reference access patterns).

The predefined access patterns may be determined by analyzing training data obtained by executions of SQL statements under similar conditions. For instance, assume an application that cyclically performs similar series of SQL statements on similar data files (e.g., data files 139). In this case, after one complete cycle wherein all SQL statements performed normally, i.e., where no severe execution error occurred, the tracked return codes may be analyzed in order to determine the access patterns. The analysis may be performed by an operator or automatically by the data processing system 110. Examples of predefined access patterns are described below with reference to FIG. 3.

If differences between a specific access pattern and a corresponding predefined access pattern are determined, the return code manager 130 identifies and executes a predetermined action in order to prevent sub-optimal performance of the data processing system 110. By way of example, the predetermined action may be one or more of: (i) acting on a subsequent statement execution 230, e.g., blocking a subsequent execution of a specific SQL statement, (ii) issuing a user notification 240 for notifying an operator of an abnormal statement execution, and (iii) acting on one or more of the data files 139 in the relational database 138, e.g., increasing a lock timeout 220 for one or more columns in a corresponding data file 139 in the relational database 138 for the subsequent execution of the SQL statement.

In one embodiment, tracking return codes, comparing the tracked return codes with predefined access patterns and identifying and performing predetermined actions is performed by the components of the return code manager 130. Each component, i.e., the configuration data 131, the return code tracking unit 132, the return code tracking list 133 and the action processing unit 134 carries out an associated function. These functions and their interaction are now described.

The return code tracking unit 132 is configured to track return codes produced by SQL statements executed against the data files 139 of the relational database 138. Accordingly, after execution of an SQL statement, the return code tracking unit 132 receives a corresponding return code from the DBMS 136. The return code tracking unit 132 stores the received return code in the return code tracking list 133. The return code tracking list 133 may be implemented as a plurality of linked lists, e.g., flagged text files, or as a plurality of data files related to each other in a relational schema. However, it should be noted that any implementation of appropriate tracking lists is contemplated. Thus, the exemplary implementation described below with reference to FIG. 4 is merely illustrative and not construed to limit the invention thereto.

Figure 4:
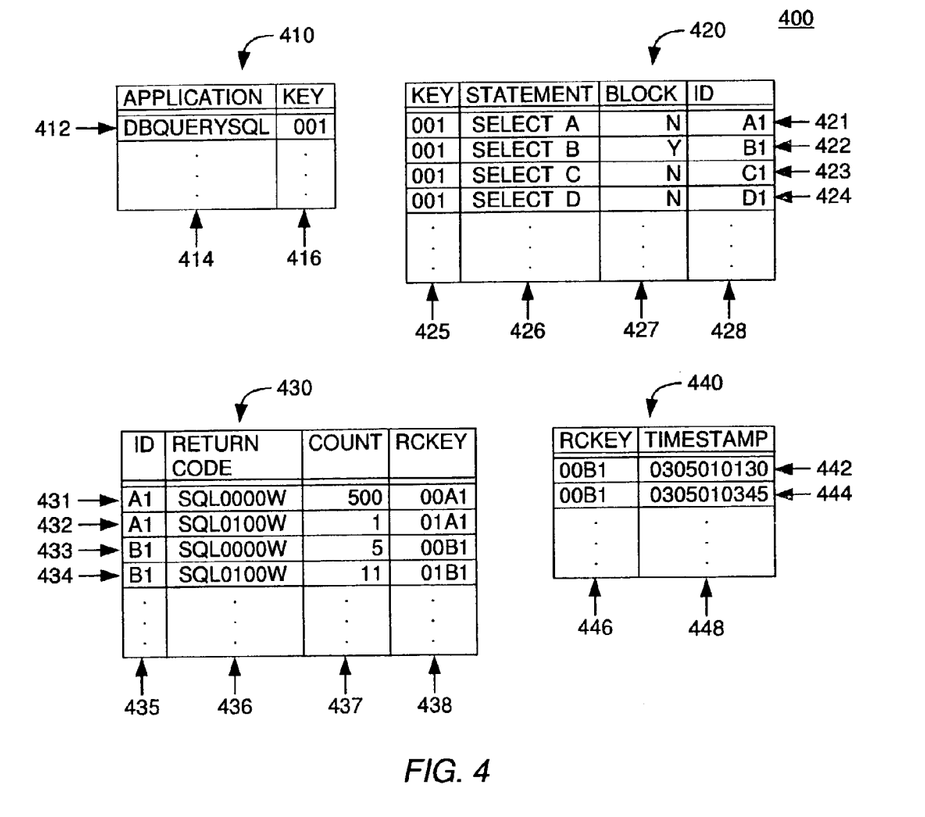

Referring now to FIG. 4, a data structure 400 is shown which illustrates the return code tracking list 133 in one embodiment. The data structure 400 has a plurality of tables 410, 420, 430 and 440 arranged in a relational schema. The tables 410, 420 and 430 are adapted to relate return codes to corresponding SQL statements and the corresponding SQL statements to applications (e.g., application(s) 120 of FIG. 1) which issued the corresponding SQL statements. Table 440 is adapted to associate a timestamp with each return code.

More specifically, table 410 includes two columns 414 and 416 and a multiplicity of rows. For simplicity, only one row 412 is shown. Column 414 contains a listing "APPLICATION" of all applications 120 which may issue SQL queries against the data files 139 stored in the relational database 138. Column 416 includes unique identifiers "KEY" (referred to as keys) which are associated with each row in the table 410 and, thus, with corresponding applications 120. The keys uniquely identify the applications 120 listed in column 414. Illustratively, the row 412 associates the key "001" with the application "DBQUERYSQL". The keys are used to link rows of the table 410 with rows of the table 420.

Table 420 includes four columns 425, 426, 427 and 428 and a multiplicity of rows. For simplicity, only four rows 421, 422, 423 and 424 are shown. Column 425 contains entries which correspond to the keys "KEY" of column 416 of the table 410. Thus, linking of the rows of tables 410 and 420 is achieved. Illustratively, all the rows 421, 422, 423 and 424 are linked to the row 412 of the table 410. Column 426 includes a listing of all SQL statements "STATEMENT" which are executed by the applications listed in the column 414 of the table 410 against the relational database 138. For simplicity, the SQL statements are abbreviated. For example, the row 422 includes the SQL statement "SELECT B" instead of "SELECT B FROM A", where "B" may be a column name and "A" may be a database table. Column 427 contains flags "BLOCK" which indicate whether a subsequent execution of associated SQL statements is blocked. Column 428 includes unique identifiers "ID" which are associated with rows in the table 420 and, thus, uniquely identify corresponding SQL statements for associated applications. The unique identifiers are used to link rows of the table 420 with rows of the table 430. Illustratively, the row 422 includes the SQL statement "SELECT B" and is uniquely identified by the unique identifier "B1". The SQL statement "SELECT B" is associated with an application identified by the key "001". Accordingly, the SQL statement "SELECT B" of the row 422 is associated with the application "DBQUERYSQL". A subsequent execution of the statement "SELECT B" is blocked, as the corresponding flag is set to yes ("Y").

Table 430 includes four columns 435, 436, 437 and 438 and a multiplicity of rows. For simplicity, only four rows 431, 432, 433 and 434 are shown. Column 435 contains entries which correspond to the unique identifiers "ID" of column 428 of the table 420. Thus, linking of the rows of tables 420 and 430 is achieved. Illustratively, the rows 433 and 434 are linked to the row 422 of the table 420. Column 436 includes a listing of all SQL return codes "RETURN CODE" which are produced upon execution of the SQL statements listed in the column 426 of the table 420. However, in one embodiment the listing may only include SQL warning return codes and/or critical return codes, i.e., return codes which need to be tracked in order to ensure optimal performance of the application 120. In fact, notification return codes need not necessarily to be tracked, as they only have informational character and confirm correct execution of associated SQL statements. Thus, it may be assumed that notification return codes do not provide information which may point to problems occurring during the execution of the associated SQL statements. Column 437 contains a listing of accumulated numbers "COUNT". Each accumulated number indicates a number of times that an associated return code was produced. Column 438 includes unique identifiers "RCKEY" which are associated with rows in the table 430 and, thus, uniquely identify corresponding SQL return codes for associated SQL statements. The unique identifiers are used to link rows of the table 430 with rows of the table 440. Illustratively, the row 433 includes the SQL return code "SQL0000W" and is uniquely identified by the unique identifier "00B1". The SQL return code "SQL0000W" is associated with an SQL statement identified by the unique identifier "B1". Accordingly, the SQL return code "SQL0000W" of the row 433 is associated with the SQL statement "SELECT B". Furthermore, the return code "SQL0000W" was received 5 times when executing the SQL statement "SELECT B". As exemplarily shown in the row 434, the return code "SQL0100W" was received 11 times when executing the SQL statement "SELECT B".

Table 440 includes two columns 446 and 448 and a multiplicity of rows. For simplicity, only two rows 442 and 444 are shown. Column 446 contains entries which correspond to the unique identifiers "RCKEY" of column 438 of the table 430. Thus, linking of the rows of tables 430 and 440 is achieved. Illustratively, the rows 442 and 444 are linked to the row 433 of the table 430. Column 448 "TIMESTAMP" includes timestamps which are associated with each receipt of an associated return code for a corresponding SQL statement. Each timestamp indicates a point of time at which the associated return code for the corresponding SQL statement was received. Illustratively, the row 442 indicates that the return code, which is uniquely identified by "00B1", was received on "0305010130", i.e., on May 1, 2003 at 01:30 AM.

Reference is now made back to FIG. 2. Using the tables 410, 420, 430 and 440 of FIG. 4, the action processing unit 134 performs return code analysis. Furthermore, if required, the action processing unit 134 identifies and performs a corresponding predetermined action. More specifically, using the tables 410, 420, 430 and 440, the action processing unit 134 determines an execution behavior for each SQL statement executed by an associated application 120 on the basis of the received return codes. By way of example, determining the execution behavior may include one or more of: (i) determining a number of times that a specific return code was received for a specific SQL statement associated with a specific application, (ii) determining a predefined rate at which a specific return code occurs with respect to all received return codes for the specific SQL statement, and (iii) determining, for a predefined time interval, a number of times that a specific return code was received. Accordingly, the execution behavior of the specific SQL statement represents the access pattern for the specific SQL statement, as it indicates how the specific SQL statement performs over time.

In one embodiment, the action processing unit 134 compares the determined execution behavior with a predetermined threshold. If the execution behavior exceeds the predetermined threshold, the action processing unit 134 identifies and performs the corresponding predetermined action. The predetermined threshold is provided by the configuration data 131 and providing the predetermined threshold represents providing the predefined access pattern for the SQL statement. More specifically, the predetermined threshold indicates a maximum accumulated number of receipts of the specific return code for the specific SQL statement for which no predetermined action needs to be taken, i.e., the maximum accumulated number of executions of the specific SQL statement considered to perform correctly.

Figure 3:
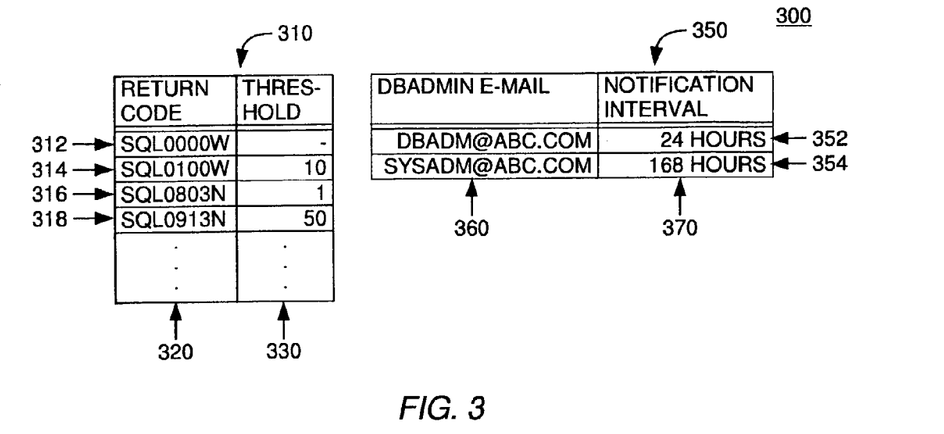
FIGS. 3 and 4 are data structures according to one embodiment of the invention.

Referring now to FIG. 3, a data structure 300 is shown which illustrates the configuration data 131 in one embodiment. The configuration data 131 is used to configure the return code manager 130 for running. The data structure 300 has a plurality of tables 310 and 350. However, the tables 310 and 350 are merely illustrative and not construed to limit the invention thereto. Instead, any possible implementation of appropriate configuration data is contemplated. Illustrative tables 310 and 350 are now described.

Table 310 contains two columns 320 and 330 and a multiplicity of rows. For simplicity, only four rows 312, 314, 316 and 318 are shown. Column 320 "RETURN CODE" contains a listing of all possible SQL return codes. However, as explained above with reference to FIG. 4, the listing may alternatively only include SQL warning return codes and/or critical return codes. Column 330 "THRESHOLD" includes thresholds which are associated with corresponding return codes. These thresholds indicate when the predetermined action needs to be taken for the specific SQL statement. Accordingly, the rows 312, 314, 316 and 318 include return code/threshold pairs. For instance, row 314 includes a threshold "10" which is associated with an SQL return code "SQL0100W".

Table 350 contains two columns 360 and 370 and a multiplicity of rows. For simplicity, only two rows 352 and 354 are shown. Column 360 "DBADMIN E-MAIL" contains a listing of one or more operators to be notified if the predetermined action was or needs to be taken. Illustratively, column 360 contains E-Mail addresses of the one or more operators. In other embodiments, column 360 may include phone numbers, fax numbers, pager numbers or any other suitable data for transmitting notifications to the one or more operator.

The one or more operators may receive reports on return code tracking at pre-set notification intervals. Such pre-set notification intervals are indicated in the column 370 "NOTIFICATION INTERVALS". In one embodiment, the indicated pre-set notification intervals are hard coded, i.e., determined by a programmer of the return code manager 130. In another embodiment they can be freely selectable by an operator, such as a database administrator. Illustratively, the row 352 indicates that the operator DBADMIN having the e-mail address "DBADMIN@ABC.COM" should receive a summarizing return code report every "24 HOURS".

Referring now to FIGS. 2 to 4, the function of the action processing unit 134 is explained in more detail by way of example. In one embodiment, the action processing unit 134 compares, for an SQL statement executed by the application 120, the data contained in the column 437 of table 430 with the thresholds defined in the column 330 of table 310. In the case of the SQL statement "SELECT B" associated with the application "DBQUERYSQL", the action processing unit 134 compares the accumulated number "11" indicated in the row 434 of table 430 with the predetermined threshold for the return code "SQL0100W", i.e., with the threshold "10" defined in the row 314 of table 310. When accumulated number exceeds the predetermined threshold, the action processing unit 134 identifies a predetermined action to be taken and performs the identified predetermined action. Assume that the predetermined action consists in blocking a subsequent execution of the SQL statement "SELECT B" for the application. Accordingly, the action processing unit 134 has set the "BLOCK" flag in the column 427 of the row 422 of table 420 to yes ("Y") and, thus, blocks the subsequent execution.

An embodiment of the operation of a DBMS (e.g., DBMS 136 of FIG. 1) and a return code manager (e.g., return code manager 130 of FIGS. 1 and 2) is described below with reference to FIGS. 5-7 (in combination with FIGS. 3 and 4) by way of example. For simplicity, in the following explanations reference is only made to the return code manager as such without explicitly referring to individual constituent functions thereof. Moreover, by referring only to the return code manager as such, an implementation thereof wherein separate constituent functions cannot unambiguously be distinguished is contemplated.

Figure 5:
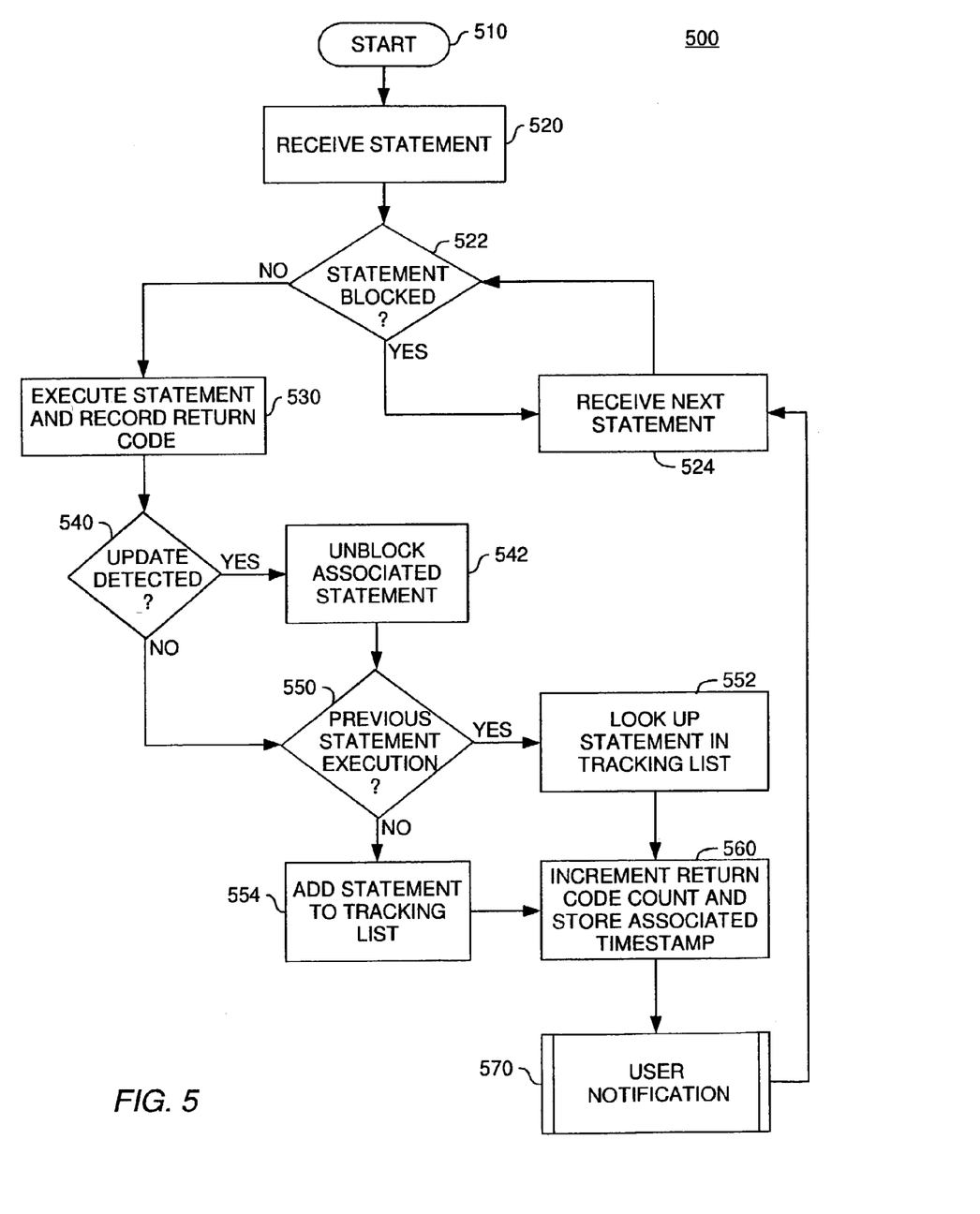
FIG. 5 is a flow chart illustrating processing of an operation and an associated return code in one embodiment.

Referring now to FIG. 5, an illustrative method 500 is shown that represents a sequence of operations as performed by the return code manager. More specifically, the sequence of operations is performed with respect to a plurality of SQL statements issued by an application (e.g., application 120 of FIG. 1 or 2) against a relational database (e.g., relational database 138 of FIG. 1 or 2) having one or more data files (e.g., data files 139 of FIG. 1 or 2) in a data processing system (e.g., data processing system 110 of FIG. 1). Method 500 is entered at step 510.

At step 520, the DBMS receives an SQL statement from the application. At step 522, the DBMS determines from table 420 whether execution of the received SQL statement is blocked. If the execution of the received statement is blocked, the DBMS does not execute the received SQL statement and continues at step 524, where a next SQL statement is received from the application. Processing then returns to step 522.

If the DBMS determines at step 522 that the execution is not blocked, the method 500 continues at step 530. At step 530, the DBMS executes the received SQL statement and returns a return code, which was produced by the execution, to the return code manager.

At step 540, the return code manager determines whether the relational database was updated by the executed SQL statement. In fact, if blocked SQL statements exist and the relational database or one or more data files stored therein were updated, one or more of the blocked SQL statements may subsequently perform correctly due to the update. For instance, assume that the executed SQL statement is an INSERT statement that inserts a data record A into a data file and that one blocked SQL statement is a SELECT statement that tries to select the data record A. As long as the data record A does not exist, the SELECT statement will always return an SQL0100W return code indicating that the data record A can not be found. Thus, execution of the SELECT statement is a waste of resources as no result will be obtained. Therefore, the SELECT statement is blocked and not executed. However, after insertion of the data record A into the data file by the INSERT statement, the SELECT statement will find the data record A. Accordingly, a subsequent execution of the SELECT statement will return an SQL0000W return code indicating that execution is successful. Consequently, the SELECT statement should be unblocked when the INSERT statement is performed.

At step 542, if the return code manager detects an update by the executed SQL statement at step 540, associated blocked SQL statements, i.e., blocked statements which are related to the update, are identified and unblocked. Thus, if a next received statement is such an unblocked statement, it may subsequently be executed. After the unblocking of associated statements at step 542 or if no update is detected at step 540, the method 500 continues at step 550.

At step 550, the return code manager determines whether the executed SQL statement has already been executed. If the executed SQL statement has already been executed, corresponding rows, i.e., data records already exist in tables 420 and 430. In this case, the return code manager locates or looks up the corresponding data records at step 552 and continues at step 560. If the executed SQL statement has not been previously executed, no corresponding data records exist in tables 420 and 430. In this case, the return code manager generates the corresponding data records at step 554 in the tables 420 and 430 and continues at step 560. If, in addition, data records need to be generated in tables 410 and 440, the return code manager also generates these data records before continuing at step 560.

At step 560, the return code manager increments the accumulated number associated with the received return code in column 437 of table 430. If, for instance, the "SELECT B" statement was executed and an SQL return code "SQL0100W" is received, the return code manager would increment the accumulated number "11" in the "COUNT" column of row 434 to "12". Furthermore, the return code manager may generate a timestamp for the executed SQL statement which indicates the execution time. The timestamp is stored in column 448 of table 440. The method 500 then continues at step 570, where a user notification is processed. A selection of a type of user notification to be generated and a corresponding processing is now described with reference to FIG. 6.

Figure 6:
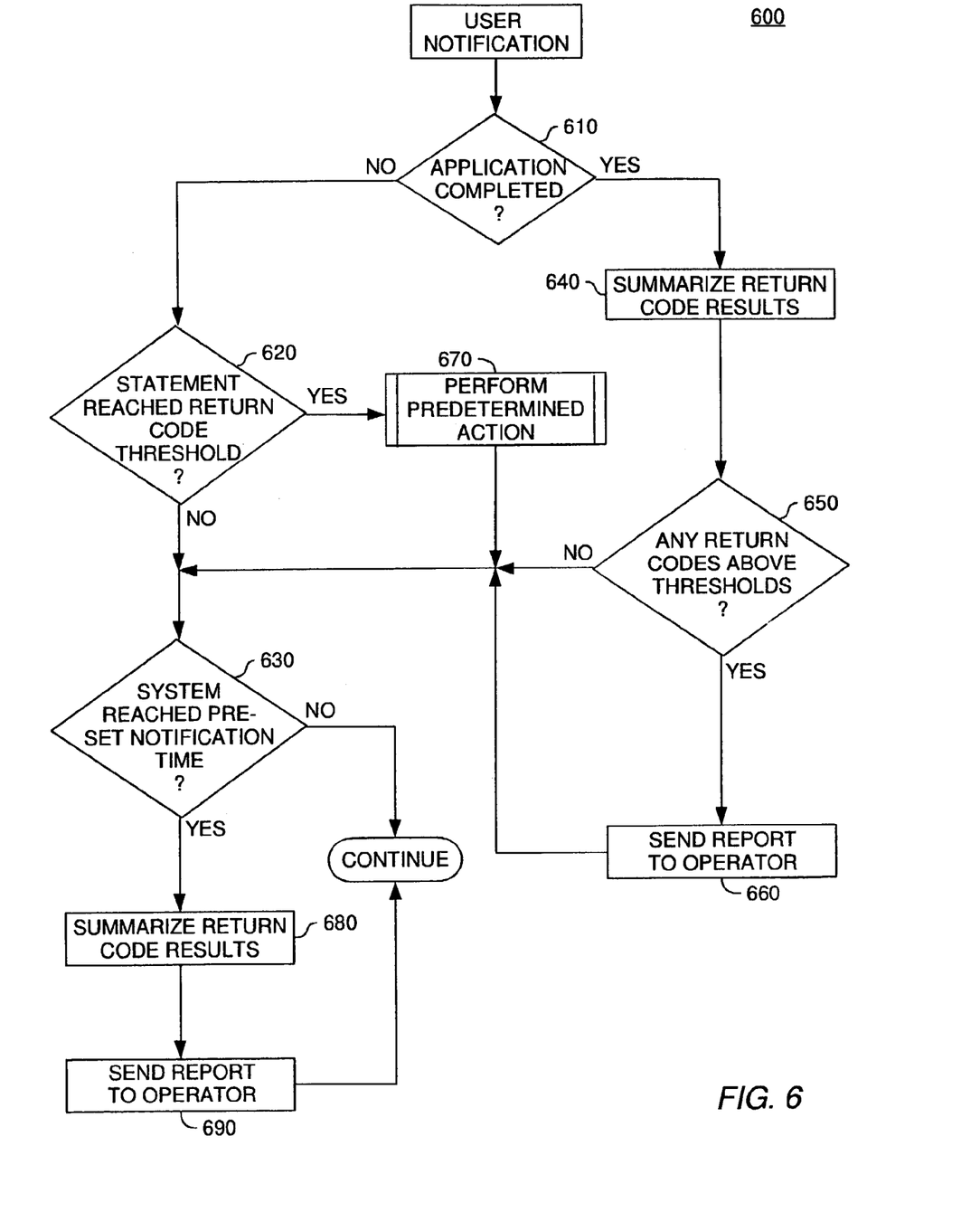
FIG. 6 is a flow chart illustrating tracking of a plurality of return codes in one embodiment.

Referring now to FIG. 6, an illustrative method 600 is shown that represents the processing performed at step 570 of FIG. 5. At step 610, the return code manager determines whether execution of the application is completed. If the execution of the application is not completed, the method 600 continues at step 620. If the execution of the application is completed, the method 600 continues at step 640.

At step 620, the return code manager determines an execution behavior of the executed SQL statement. In the illustrated example, the return code manager determines the accumulated number in column 437 of table 430 which is associated with the return code received for the executed SQL statement. Furthermore, the return code manager determines whether the accumulated number exceeds a corresponding threshold. To this end, the return code manager locates the corresponding threshold in column 330 of table 310. If the corresponding predetermined threshold is not exceeded, the method 600 continues at step 630. If the corresponding predetermined threshold is exceeded, the method 600 continues at step 670.

At step 670, the method 600 selects and performs a predetermined action to be taken. Selection and performance of the predetermined action is described below with reference to FIG. 7. The method 600 then also continues at step 630.

At step 630, the return code manager determines whether the data processing system reaches a pre-set notification time. This may be accomplished by determining an absolute time value or by determining whether a predetermined notification interval has elapsed. The return code manager determines a predetermined notification interval from column 370 of table 350. If the data processing system does not reach the pre-set notification time, processing continues at step 524 of FIG. 5. However, if the data processing system reaches the pre-set notification time, the return code manager summarizes all previously tracked return codes using at least a portion of the tables 410, 420, 430 and 440 at step 680 in order to generate a return code report. At step 690, the return code manager sends the generated report to an operator, for instance the database administrator. Contact information like an e-mail address of the operator is determined from column 370 of table 350. Processing then also continues at step 524 of FIG. 5.

Referring now back to step 610. If it is determined at step 610 that the execution of the application is completed, the return code manager summarizes at step 640 all tracked return codes relating to the application. The return code manager uses at least a portion of the tables 410, 420, 430 and 440 in order to generate a return code report. At step 650 the return code manager determines for the completed application whether any one of the associated accumulated numbers in column 437 of table 430 exceeds a corresponding threshold. If no corresponding predetermined threshold is exceeded, processing continues at step 630. If, however, any one of the corresponding thresholds is exceeded, the return code manager sends the generated report to an operator at step 660. Processing then also continues at step 630.

Figure 7:
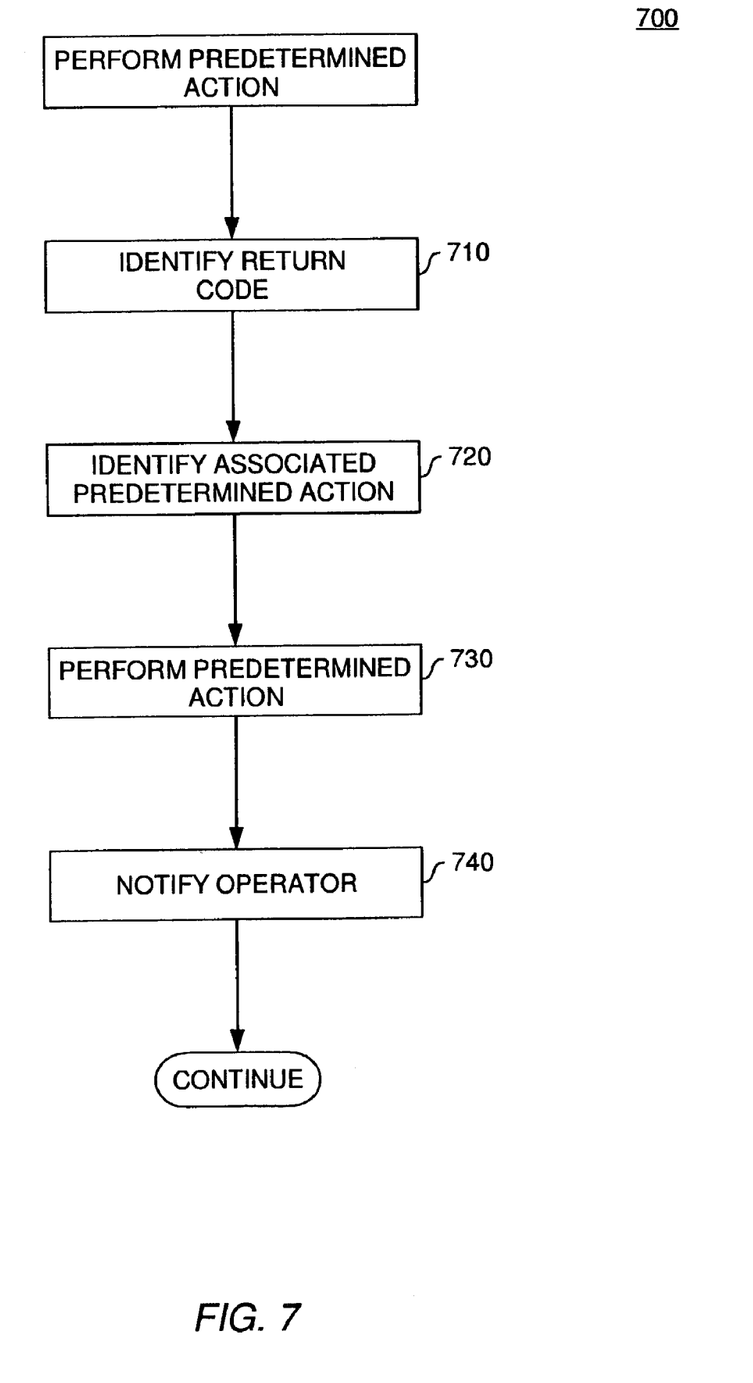
FIG. 7 is a flow chart illustrating an embodiment of operation execution management.

Referring now to FIG. 7, an illustrative method 700 is shown that represents the processing performed at step 670 of FIG. 6. At step 710, the return code manager identifies the return code received for the executed SQL statement. At step 720, the return code manager identifies the predetermined action to be taken on the basis of the identified return code. In one embodiment, this identification is made on the basis of a table provided as part of configuration data (e.g., configuration data 131 of FIG. 1 or 2), which can be implemented like table 310. At step 730, the return code manager performs the identified predetermined action. At step 740, the return code manager notifies an operator of the performed predetermined action. If no action was performed, the return code manager may notify the operator accordingly.

The method 700 is now further described by way of example. For instance, for an SQL statement of the INSERT type, the return code identified at step 710 may be an SQL0100W, an SQL0803N or an SQL0913N (or some other return code).

Case 1: SQL0100W Return Code:

The SQL0100W return code may indicate that the result of a SELECT statement is empty for a given data file. In this case, the return code manager may identify a monitoring and blocking action to be taken. Specifically, the return code manager starts monitoring the given data file in order to detect updates thereon. More specifically, the return code manager determines whether UPDATE or INSERT statements are executed against the given data file. In addition, the return code manager blocks any subsequent execution of the SELECT statement and other matching SQL statements on the given data file (e.g., acting 230 on statement execution of FIG. 2). The return code manager then notifies the operator that the monitoring and blocking action has been performed. If an update is detected on the given data file, the SELECT statement and/or the other matching SQL statements can be unblocked.

Case 2: SQL0803N Return Code:

The SQL0803N return code may indicate that one or more values in the INSERT statement are not valid because they would produce duplicate rows for a table with a primary key, unique constraint or unique index. Processing in this case is similar to the processing in Case 1 except that UPDATE and DELETE statements are monitored for, instead of UPDATE and INSERT statements.

Case 3: SQL0913N Return Code:

The SQL0913N return code may indicate an unsuccessful execution of a statement caused by a deadlock or timeout of an accessed column/row in the relational database. In this case, the return code manager may identify a lock timeout increase action to be taken (e.g., acting 220 on object lock timeout of FIG. 2). More specifically, the return code manager may increase a time interval for the accessed column/row in the given data file. The time interval specifies how long any subsequent statements will wait until the accessed column/row is available. This essentially applies if access to the column/row is locked by another statement/application. The return code manager then notifies the operator that the lock timeout increase action has been performed.

In at least one embodiment, numerous advantages over the prior art are achieved. An illustrative application of one embodiment is with respect to custom database querying applications which are fit into a batch window. An application that normally runs during several hours on a database can be executed in a fraction of this time if certain database operations can be blocked. In this case, database access patterns can be analyzed to determine data files stored in the database which cause frequent or continuous exceptions. In other words, database operations can be determined which do not result in a return code that indicates that execution of a corresponding operation was successful. On the basis of the determined database access patterns, in general, a significant number of database operations can be identified which may be avoided since there is no logical way the operations can be validly executed.

For instance, assume an insurance company that runs a specific application at night for processing insurance claims. Such a nightly processing may process millions of insurance claims one at a time. Generally, the processing requires each insurance claim to go through certain validation steps and data retrieval steps to make the insurance claim complete. While processing a first insurance claim, information in an extended data file related to doctors using a DOCTOR ID field as key may be looked up. If, for example, the DOCTOR ID field for the first insurance claim is 14 and a corresponding data record is not found, execution of a corresponding statement for processing of the first insurance claim will fail. Moreover, for similar statements in subsequent insurance claims, it is highly probable that these similar statements trying to look up the same DOCTOR ID field will also fail. In other words, it may be assumed that for all subsequent insurance claims processed in the batch mode this DOCTOR ID field can not be found. This knowledge may be used to advantage to short circuit the corresponding statement, i.e., the database operation, from ever taking place.

Another illustrative application of one embodiment is with respect to "historical" patterns of return codes. For example, an application may return for a few hours return codes indicating that updating a row is successful but then for any reason the row cannot be updated any more because it violates a CHECK constraint. Another example are applications that INSERT rows correctly for a while and then fail with duplicate key errors. In both cases special code may be added to the application(s) to avoid database operations if it can be determined that the application(s) would reach such a point by executing the database operations.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing execution of operations in a data processing system, comprising, by operation of at least one computer processor:

tracking return codes received from previous executions of a plurality of operations in the data processing system; wherein tracking the return codes comprises:

storing the return codes for each previous execution in a return code tracking list, wherein the list associates each stored return code with a respective operation; and storing a timestamp in the list for each stored return code, the timestamp being indicative of when the respective return code was received following execution of its respective operation; whereby the list contains a plurality of sets of return codes, each set containing those return codes related to a particular operation;

determining an execution behavior of each of the plurality of operations from the return codes stored in the list, wherein determining the execution behavior of each operation comprises:

analyzing each set of return codes with respect to a predetermined behavior pattern for the particular operation of the set; and managing a subsequent execution of each operation on the basis of the determined execution behavior.

2. The method of claim 1, wherein the operation is an SQL statement executed on a relational database in the data processing system.

3. The method of claim 1, wherein determining an execution behavior of the operation comprises determining whether a specific return code occurs a number of times which exceeds a predetermined threshold.

4. The method of claim 1, wherein determining an execution behavior of the operation comprises determining whether a specific return code occurs with respect to all received return codes at a predefined rate which exceeds a predetermined threshold.

5. The method of claim 1, wherein determining an execution behavior of the operation comprises determining whether a specific return code occurs in a predefined time interval a predefined number of times which exceeds a predetermined threshold.

6. The method of claim 1, wherein managing the subsequent execution of the operation comprises at least one of:

blocking the subsequent execution of the operation; and notifying an operator.

7. A computer-implemented method for managing execution of SQL statements on a relational database of a data processing system, comprising, by operation of at least one computer processor:

tracking return codes received from previous executions of the SQL statements on the relational database; wherein tracking the return codes comprises:

storing the return codes for each previous execution in a return code tracking list, wherein the list associates each stored return code with a respective SQL statement; and storing a timestamp in the list for each stored return code, the timestamp being indicative of when the respective return code was received following execution of its respective SQL statement; whereby the list contains a plurality of sets of return codes, each set containing those return codes related to a particular one of the SQL statements;

determining an execution behavior of each of the SQL statements on the basis of the return codes stored in the list; wherein determining the execution behavior of each SQL statement comprises:

analyzing each set of return codes with respect to a predetermined behavior pattern for the particular SQL statement of the set;

identifying, on the basis of the determined execution behavior, a predetermined action to be performed with respect to a subsequent execution of each of the SQL statements; and performing the identified predetermined action in the data processing system.

8. The method of claim 7, wherein the identified predetermined action comprises at least one of:

blocking the subsequent execution of the SQL statement;

notifying an operator; and increasing a lock timeout for one or more columns in the relational database for the subsequent execution of the SQL statement.

9. The method of claim 7, wherein the identified predetermined action is performed if a specific return code occurs a number of times which exceeds a predetermined threshold.

10. The method of claim 7, wherein the identified predetermined action is performed if a specific return code occurs with respect to all received return codes at a predefined rate which exceeds a predetermined threshold.

11. The method of claim 7, wherein the identified predetermined action is performed if a specific return code occurs in a predefined time interval a predefined number of times which exceeds a predetermined threshold.

12. A computer readable storage medium containing a program which, when executed by a computer processor, performs a process for managing execution of an operation in a data processing system, the process comprising:

tracking return codes received from previous executions of a plurality of operations in the data processing system; wherein tracking the return codes comprises:

storing the return codes for each previous execution in a return code tracking list, wherein the list associates each stored return code with a respective operation; and storing a timestamp in the list for each stored return code, the timestamp being indicative of when the respective return code was received following execution of its respective operation; whereby the list contains a plurality of sets of return codes, each set containing those return codes related to a particular operation;

determining an execution behavior of each of the plurality of operations from the return codes stored in the list, wherein determining the execution behavior of each operation comprises:

analyzing each set of return codes with respect to a predetermined behavior pattern for the particular operation of the set; and managing a subsequent execution of each operation on the basis of the determined execution behavior.

13. The computer readable storage medium of claim 12, wherein the operation is an SQL statement executed on a relational database in the data processing system.

14. The computer readable storage medium of claim 12, wherein determining an execution behavior of the operation comprises determining whether a specific return code occurs a number of times which exceeds a predetermined threshold.

15. The computer readable storage medium of claim 12, wherein determining an execution behavior of the operation comprises determining whether a specific return code occurs with respect to all received return codes at a predefined rate which exceeds a predetermined threshold.

16. The computer readable storage medium of claim 12, wherein determining an execution behavior of the operation comprises determining whether a specific return code occurs in a predefined time interval a predefined number of times which exceeds a predetermined threshold.

17. The computer readable storage medium of claim 12, wherein managing the subsequent execution of the operation comprises at least one of:

blocking the subsequent execution of the operation; and notifying an operator.

18. A computer readable storage medium containing a program which, when executed, performs a process for managing execution of an SQL statement on a relational database of a data processing system, the process comprising:

tracking return codes received from previous executions of the SQL statements on the relational database; wherein tracking the return codes comprises:

storing the return codes for each previous execution in a return code tracking list, wherein the list associates each stored return code with a respective SQL statement; and storing a timestamp in the list for each stored return code, the timestamp being indicative of when the respective return code was received following execution of its respective SQL statement; whereby the list contains a plurality of sets of return codes, each set containing those return codes related to a particular one of the SQL statements;

determining an execution behavior of each of the SQL statements on the basis of the return codes stored in the list; wherein determining the execution behavior of each SQL statement comprises:

analyzing each set of return codes with respect to a predetermined behavior pattern for the particular SQL statement of the set;

identifying, on the basis of the determined execution behavior, a predetermined action to be performed with respect to a subsequent execution of each of the SQL statements; and performing the identified predetermined action in the data processing system.

19. The computer readable storage medium of claim 18, wherein the identified predetermined action comprises at least one of:

blocking the subsequent execution of the SQL statement;

notifying an operator; and increasing a lock timeout for one or more columns in the relational database for the subsequent execution of the SQL statement.

20. The computer readable storage medium of claim 18, wherein the identified predetermined action is performed if a specific return code occurs a number of times which exceeds a predetermined threshold.

21. The computer readable storage medium of claim 18, wherein the identified predetermined action is performed if a specific return code occurs with respect to all received return codes at a predefined rate which exceeds a predetermined threshold.

22. The computer readable storage medium of claim 18, wherein the identified predetermined action is performed if a specific return code occurs in a predefined time interval a predefined number of times which exceeds a predetermined threshold.

23. A data processing system comprising:

a relational database;

a return code manager residing in memory for managing execution of SQL statements on the relational database, the return code manager being configured for:

tracking return codes received from previous executions of the SQL statements on the relational database; wherein tracking the return codes comprises:

storing the return codes for each previous execution in a return code tracking list, wherein the list associates each stored return code with a respective SQL statement; and storing a timestamp in the list for each stored return code, the timestamp being indicative of when the respective return code was received following execution of its respective SQL statement; whereby the list contains a plurality of sets of return codes, each set containing those return codes related to a particular one of the SQL statements;

determining an execution behavior of each of the SQL statements on the basis of the return codes stored in the list; wherein determining the execution behavior of each SQL statement comprises:

analyzing each set of return codes with respect to a predetermined behavior pattern for the particular SQL statement of the set;

identifying, on the basis of the determined execution behavior, a predetermined action to be performed with respect to a subsequent execution of each of the SQL statements; and performing the identified predetermined action in the data processing system; and a processor for executing the SQL statements on the relational database and for running the return code manager.

* * * * *